July 6, 1926.

W. AMES 1,591,258

CYLINDER GAUGE

Filed June 30, 1921

Inventor
Warren Ames.
by Charles S. Gooding
Att'y

Patented July 6, 1926.

1,591,258

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

CYLINDER GAUGE.

Application filed June 30, 1921. Serial No. 481,622.

This invention aims to provide a cylinder gauge particularly adapted for use in the automotive industry although, obviously, it is susceptible of various other uses.

Referring to the drawings wherein I have shown one illustrative embodiment of my invention:

Like numerals refer to like parts throughout the several views of the drawings.

Figure 1:
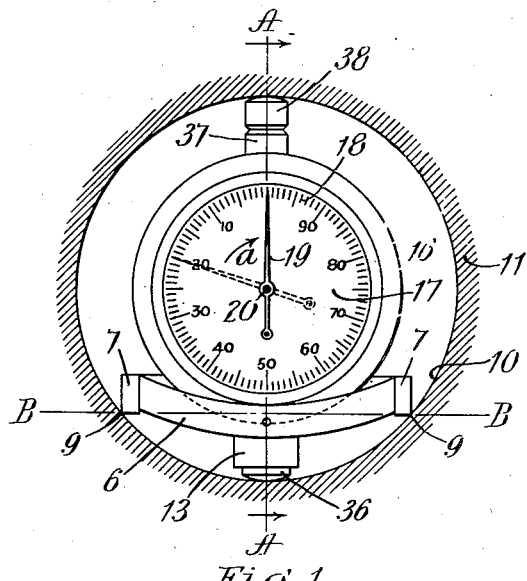
Figure 1 is a front elevation of a cylinder gauge embodying my invention, the same being illustrated in position within a cylinder.

In the illustrative embodiment of my invention shown in the drawings, 6 represents an elongated locating guide or base upon the opposite edges of which suitable shoes 7 may be attached by screws 8. The shoes 7 are preferably very accurately constructed of hardened steel or other suitable material and each has an edge 9 formed by the intersection of the outer and under surface thereof which edges are adapted to engage the interior surface 10 of a cylinder 11 as illustrated in Fig. 1, the said edges 9 being both located in a plane indicated by the broken line B—B in said figure. Obviously the shoes are not indispensable, the only requirement being that the base present portions adapted for contact with a cylinder wall at points on parallel lines.

Figure 3:
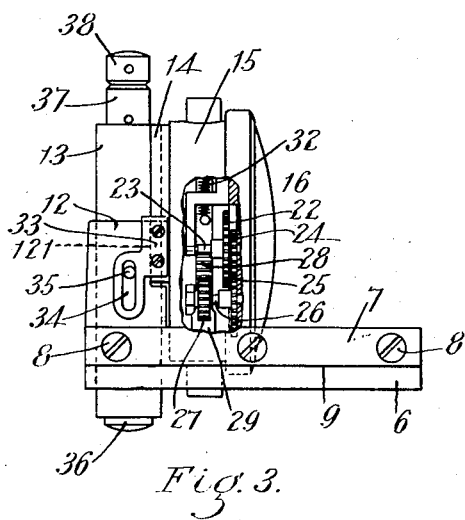
Fig. 3 is a side elevation of the same, a portion thereof being broken away to disclose a portion of the interior mechanism.

As shown in Fig. 3 I have provided a hollow boss 12 which forms an upstanding guide in which a slidable support or sleeve is mounted to slide freely with its axis of movement positioned in an axial plane of a cylinder as indicated by the line A—A in Fig. 1. The guide is preferably located centrally between the contacting edges of the positioning base and normal to a plane containing the lines of contact as indicated by line B—B in Fig. 1.

Preferably rigidly fastened to the support or sleeve 13 is a back plate 14 of a housing or casing 15 of an indicating device 16 embodying therein a rotatable dial 17 upon which are graduations 18 representing one thousandth of an inch and an indicator 19 adapted to register with said graduations. The construction of the indicating device 16 is old and well known to those skilled in the art, the indicator 19 being mounted upon an arbor 20 which is rotated through the medium of a train of gearing which includes a pinion 21 fast to the arbor 20, a gear 22 fast to an arbor 23, said gear 22 meshing with the pinion 21, a pinion 24 also fast to the arbor 23, a gear 25 fast to an arbor 26, said gear 25 meshing with the pinion 24, a gear 27 also fast to the arbor 26, said gear 27 being rotated by rack teeth 28 formed upon a reciprocatory slide 29 mounted in the casing 15. The normal position of the indicator 19 when the device is not in use may be the same as that illustrated in full lines in Figure 1 and from said position said indicator may make approximately three rotations in the direction of the arrow $a$ in said Figure 1, or as determined by the movement of the reciprocatory slide 29 which is limited by a stop screw 30 fast in said slide which contacts with the opposite ends of a slot 31 provided in the casing 15. A spring 32 normally acts to pull the reciprocatory slide 29 into the position illustrated in Figure 4 in which position the stop screw 30 is located at the upper extremity of the slot 31.

A suitable stop member of sheet metal for example, 33 is fast to the back plate 14 of the housing or casing 15 and is provided with a slot 34 through which a pin 35 fast to the boss 12 projects, thereby limiting the sliding movement of the support or sleeve 13 with the indicating device 16 thereon relatively to the base 6. The support or sleeve is furthermore prevented from rotating upon the base 6 by reason of the back plate 14 engaging a cut-away portion 121 of the boss 12, although the stop member 33 and pin 35 also prevents said rotating movement if there is clearance between said cut-away portion 121 and said back plate.

Rigidly secured within the support or sleeve 13 at the lower end thereof and projecting a short distance below said lower end is a contact member or feeler 36 having a convex outer extremity adapted to contact with the interior surface 10 of the cylinder 11 as illustrated in Fig. 1. In effect the contact member 36 forms a part of the support or sleeve 13 and if so desired could be constructed as such without departing from the spirit of this invention.

Figure 5:
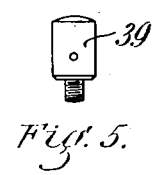
Fig. 5 is a detail elevation of an extension point for the yielding gauge member.

Yieldingly mounted within the support or sleeve 13 in longitudinal alignment with the contact member 36 and projecting beyond the upper extremity thereof is another contact member or feeler 37 at the outer end of which is detachably secured in any desired manner an extension point 38 having a convex outer extremity adapted to contact with the interior surface 10 of the cylinder 11 as illustrated in Fig. 1. A plurality of extension points are provided for the contact member 37, the length of each being increased in steps of preferably one quarter of an inch and in Fig. 5 another extension point 39 is illustrated, the same being exactly one quarter of an inch longer than the extension point 38 illustrated in the various other figures of the drawings. A spring 40 is located within the interior of the sleeve 13, being interposed between the contact member 36 and the contact member 37 and said spring acts to always force the contact member 37 outwardly from within the sleeve 13 and also allows said contact member 37 to yield inwardly when the device is placed in position within a cylinder as illustrated in Fig. 1. The spring 40 also, however, interposed as it is between the two contact members, allows either to yield relatively to the other. The longitudinal median line of the sleeve 13, contact members 36 and 37 and the extension point 38 of the latter are all coincident with the line A—A and all are, therefore, perpendicular to the plane B—B.

The contact member 37 is preferably provided with a peripheral groove 41 extending therearound arranged to receive the end portion of a pin 42 which is rigidly fastened in the reciprocatory slide 29 and projects therefrom rearwardly through a slot 43 provided in the back plate 14 and the support or sleeve 13. The pin 42 therefore transmits the movement of the contact member 37 to the reciprocatory slide and both reciprocate in unison while the movement of the reciprocatory slide is transmitted through the before-mentioned train of gearing to the indicator 19.

Figure 2:
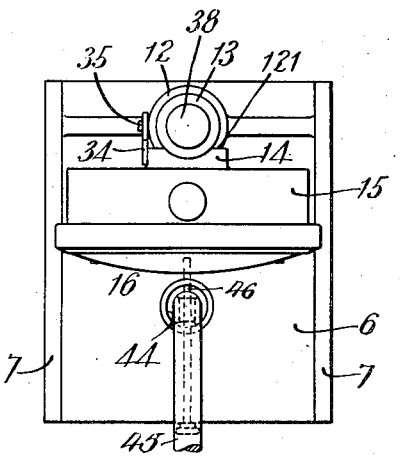
Fig. 2 is a plan view of the cylinder gauge.
Figure 4:
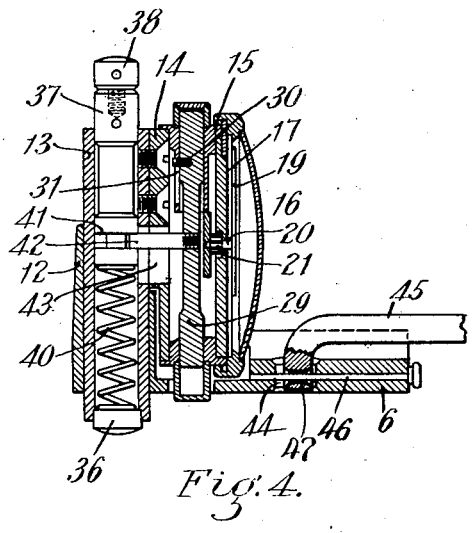
Fig. 4 is a vertical section taken on the line A—A of Fig. 1.

To provide for convenient manipulation of the instrument, a hole 44 is preferably provided extending through the base 6 in which a suitable handle 45 may be secured if it is so desired as illustrated in Figs. 2 and 4. The handle 45 may be of any desired length and is attached to the base 6 by a pin 46. It is desirable that the handle shall be attached to the base in such a manner that said handle may have a limited universal movement upon said base and to obtain this result the hole 44 is provided considerably larger in diameter than the diameter of the portion of the handle 45 located in said hole. The pin 46 furthermore extends through an opening 47 provided in the handle 45, said opening also being of greater diameter than the diameter of said pin. This construction is very simple and allows sufficient relative movement between the base and handle for the purposes required.

The general operation of the device, as applied to worn cylinders of automotive engines, for example, is as follows:—Assuming that it is desired to ascertain exactly how much larger in diameter a given cylinder must be made to provide a uniform reground bore and the diameter of the oversize piston which will be required, the appropriate one of the extensions for the feeler 37 is inserted and the contact points of the feelers are pressed toward each other and are inserted in an outside micrometer caliper or block gauge or their equivalent, which has been set approximately at the original diameter of the bore, say three inches for the purpose of illustration. The dial of the indicator is then turned so that the zero is under the end of the pointer. The instrument is inserted within the worn cylinder and the feelers are located or positioned automatically on a true diameter as shown in Fig. 1. If the axis of the cylinder is vertical or slightly inclined to the vertical it is only necessary to apply manual pressure to the base of the instrument, to cause it to engage stably with the cylinder wall. The instrument is pushed back and forth and around this wall of the cylinder until the largest diameter is found, that is to say, until the pointer shows a maximum deflection in a counter-clockwise direction from the zero reading. The dotted position of the pointer in Fig. 1 would indicate that the diameter of the cylinder is three and twenty thousandths (3.020) inches.

From the foregoing operation the operator can determine, readily and accurately, the required diameter for a new piston and proceed with the regrinding or the reboring of the cylinder. The instrument may again be employed to ascertain how the regrinding operation is progressing and, particularly, whether or not the new inner surface is perfectly cylindrical.

Obviously my invention is not limited to the specific details of construction shown and described.

I claim:

1. A device of the character described having, in combination, a base adapted to contact with the interior surface of any one of several hollow cylinders of substantially differing diameters at points arranged in the cylinder upon two lines separated a substantial distance so that when all of said points are in contact with the wall of the cylinder the lines will be parallel with the axis of the cylinder, a pair of contact feelers mounted upon said base to slide independently and transversely of the plane of said lines, midway between them and perpendicular to said plane, an indicating device mounted upon one of said contact feelers and means operatively connecting the other of said contact feelers with said indicating device and adapted to operate the latter.
2. A device of the character described having, in combination, a base adapted to contact with the interior surface of any of several hollow cylinders of substantially differing diameters at points arranged in the cylinder upon two lines separated a substantial distance so that when all of said points are in contact with the wall of the cylinder the lines will be parallel with the axis of the cylinder, a pair of aligned yieldably mounted contact feelers arranged upon said base to slide axially one with reference to the other midway between said lines and perpendicular to the plane in which said lines of contact are located, an indicating device mounted upon one of said contact feelers and means operatively connecting the other of said contact feelers with said indicating device and adapted to operate the latter.
3. A device of the character described having, in combination, a base adapted to contact with the interior surface of any of several hollow cylinders of substantially differing diameters at points arranged in the cylinder upon two lines separated a substantial distance so that when all of said points are in contact with the wall of the cylinder the lines will be parallel with the axis of the cylinder and in a plane at one side of the axis, a contact feeler mounted upon said base midway between said lines of contact to slide transversely of the plane of said lines and perpendicular thereto, a second contact feeler, means permitting yielding movement of said second contact feeler relative to said first-named contact feeler, an indicating device fixedly connected to said first-named contact feeler, and means operatively connecting the other contact feeler with said indicating device and adapted to operate the latter.
4. A cylinder gauge comprising, in combination, a base adapted to contact with the interior surface of any one of several hollow cylinders of substantially differing diameters at points arranged in the cylinder upon two lines separated a substantial distance so that when all of said points are in contact with the wall of the cylinder the lines will be parallel with the axis of the cylinder, a sliding support mounted upon said base and reciprocable transversely of a plane containing said lines in a direction such that a given portion thereof always remains in a plane perpendicular to the plane in which said two lines are located, a contact feeler fixed to said sliding support, a second contact feeler yieldably mounted with respect to said sliding support, an indicating device carried by said sliding support, and means connecting said second contact feeler with said indicating device to operate the latter by relative movements of said contact feelers.
5. A device of the character described having, in combination, a base adapted to contact with the interior wall of any one of several hollow cylinders of substantially differing diameters at points arranged in the cylinder upon two widely separated lines so that when all of said points are in contact with the wall of the cylinder the lines will be parallel with the axis of said cylinder, a housing on said base slidably mounted for reciprocating movement transversely of the plane of said lines, a contact device fixed relative to said housing, a second contact device mounted to reciprocate with respect to said housing, said contact devices being so mounted that their contact extremities are in a plane perpendicular to the plane containing the lines of contact of said base and midway between them, a spring operatively interposed between said contact devices, an indicator carried by said housing, means operatively connecting said second contact device with said indicator for indicating the relation of said points to each other as compared with a known distance, and a manipulating handle connected to said base.
6. A cylindrical gauge comprising, in combination, an elongated base adapted to contact with the interior surface of any one of several hollow cylinders of substantially differing diameters at widely separated points arranged in the cylinder upon two parallel lines separated a substantial distance, a pair of relatively movable feelers on said base supported to reciprocate relative thereto and having their contacting extremities lying in a plane perpendicular to the plane containing the lines of contact of said base and midway between such lines, an indicator, and connecting means between said indicator and said feelers for operating said indicator upon the relative movements of said feelers.
7. A cylinder gauge comprising, in combination, two relatively movable contact devices, a locating guide carrying said contact devices and presenting portions each adapted to contact with the inner wall of a cylinder only at a plurality of points in a common straight line, the contact lines of the different portions being parallel, whereby to locate said contact devices transversely of the cylinder to engage the inner wall at points located in an axial plane of the cylinder, both of said contact devices being mounted for movement relative to said locating guide, an indicator and means operatively connecting said contact devices to said indicator whereby the latter is responsive to relative movements of the devices.

8. A cylinder gauge comprising, in combination, two relatively movable feelers, a locating guide operatively supporting said feelers and presenting portions each engageable with the inner surface of the cylinder only at a plurality of points on a line parallel with the axis of the cylinder, the extreme points of contact of each of said portions being separated a substantial distance, said feelers being mounted for reciprocation relative to said guide, and being located thereby to position said feelers in contact with the cylinder wall at points in an axial plane of the cylinder, an indicator and means operatively connecting said feelers to said indicator whereby to indicate the relation of the points of said feelers to each other as compared with a known distance.

9. A device of the character described comprising, in combination, a base adapted to contact with the interior wall of any one of several hollow cylinders of substantially differing diameters upon lines located a substantial distance apart so that when all of said points are in contact with the wall of the cylinder the lines will be parallel with the axis of the cylinder, a housing slidably mounted upon said base and reciprocable transversely of the plane of said lines in a direction such that a given portion thereof always remains in a plane perpendicular to the plane in which said lines are located, a feeler fixed relative to said housing and adapted to engage the cylinder wall, a second feeler yieldably mounted relative to said housing and said first-mentioned feeler also adapted to engage the cylinder wall, an extension point for one of said feelers, an indicating device, and means operatively connecting said second feeler to said indicating device.

10. A gauge for measuring the interior diameter of cylinders, said gauge comprising, in combination, two feelers having extremities adapted for tangential contact respectively with diametrically opposite points of the cylinder wall, a base supporting said feelers for movement relative thereto and to each other, said base adapted for stable contact with the cylinder wall at two series of points only, the series being respectively distributed along straight lines parallel to one another, the feelers being so mounted on the base that their points of tangential contact are in a plane parallel to the contact lines of the base, perpendicular to the plane of said lines and midway between them, an indicator and means whereby the indicator is controlled by the relative movement of the feelers to indicate the distance between their contact points.

11. A device of the character described having, in combination, a guiding base adapted to contact with the interior surface of a hollow cylinder at points arranged in the cylinder upon two lines so that when all of said points are in contact with the wall of the cylinder the lines will be parallel with the axis of said cylinder, a sliding sleeve mounted upon said base midway between said lines of contact to reciprocate in a plane perpendicular to the plane in which said lines of contact are located, a contact feeler fixed to said sleeve, a second contact feeler yieldably mounted within said sleeve, the contact extremities of said feelers being in said plane perpendicular to the plane of said lines, an extension point detachably carried by said yieldably mounted contact feeler, an indicator mounted upon said sleeve, and a train of gearing operatively connecting said yieldably mounted contact feeler with said indicator.

12. A device of the character described having, in combination, a guiding base presenting portions adapted to contact with the inner wall of any one of several cylinders of substantially differing diameters on two widely separated parallel lines, a housing slidably mounted on said base and guided for reciprocation relative thereto, a feeler fixed relative to said housing, a second feeler slidably mounted in said housing, the contacting extremities of said feelers being supported in a plane perpendicular to the plane which contains the lines of contact of said base and midway between them, a spring operatively interposed between said feelers, an indicator carried by said housing, means to limit the movement of said housing upon the base, and movement multiplying gearing operatively connecting said slidable feeler with said indicator.

13. A device of the character described comprising, in combination, a base presenting portions adapted for stable contact with the interior surface of any one of several hollow cylinders of substantially differing diameters only at points arranged in the cylinder upon two straight lines, so that when all of said points are in contact with the wall of the cylinder, the lines will be parallel with the axis of the cylinder, a pair of relatively movable contact members carried by said base and mounted to slide independently with respect thereto, said contact members being so supported by said base that their contact extremities are located in a plane midway between the contacting portions of said base and perpendicular to the plane in which said lines of contact are located, an indicator, and connecting means between said contact members and said indicator for operating the indicator upon the relative movements of said contact members.

14. A gauge for measuring the interior diameter of cylinders, said gauge comprising, in combination, a pair of feelers each presenting an extremity adapted for point contact with the cylinder wall, a locating guide supporting said feelers for reciprocating movement relative thereto and for movement relative to each other, said locating guide being shaped to have contact with the cylinder wall at two series of points, the series being respectively distributed along straight lines parallel to one another, the feelers being so mounted on the locating guide that their contacting extremities are in a plane parallel to the contact lines of the base, perpendicular to the plane of said lines and midway between them, an indicator and means whereby the indicator is controlled by the relative movement of the feelers.

15. A cylinder gauge comprising, in combination, a base movable upon and adapted to fit against the wall of any one of a plurality of cylinders of substantially differing diameters and to fit such wall only when the points of contact of said base therewith are arranged in the cylinder upon two lines parallel with the axis of the cylinder, two relatively movable contact feelers associated with said base, both movable relative to the base and guided thereby so as to position the contact extremities of said feelers in a plane midway between the contacting portions of said base and perpendicular to the plane containing said lines of contact, indicating means controlled by the relative positions of said contact feelers, and movement multiplying means operatively connecting said indicating means to one of said contact feelers.

16. A device of the character described comprising, in combination, a guiding base shaped to have one determined stable contact with the interior surface of a hollow cylinder, a pair of relatively movable contact feelers carried by said base, said feelers being so mounted as to be guided by said base into diametric contact with said cylinder, a handle and a connection between said handle and base comprising a joint permitting universal movement of said handle relative to said base.

17. A device of the character described having, in combination, a base adapted to contact with the interior surface of a hollow cylinder and provided with an opening formed therein, an indicator mounted upon said base, a handle projecting into said opening, the portion of said handle within said opening being relatively smaller than said opening, said handle also having an opening extending therethrough and a pin mounted in said base and projecting through the opening in said handle, said pin being relatively smaller than the opening in said handle.

18. A cylinder gauge comprising, in combination, a movable contact device, a locating guide for locating said contact device with its line of movement in a plane passing through the axis of a cylinder and a handle loosely connected on said locating guide for universal movement whereby to press the same against a wall of a cylinder.

19. A cylinder gauge comprising, in combination, an elongated base presenting portions adapted for stable contact on two parallel lines only with the inner wall of any one of several cylinder of substantially differing diameters, a guide fixed on said base normal to a plane containing said parallel lines, a pair of aligned relatively movable feelers carried by said base and mounted to reciprocate in a direction determined by said guide, spring means operatively interposed between said feelers and normally urging one of said feelers into contact with the wall of the cylinder at a point between and substantially equidistant from said parallel lines of contact, an indicator carried by one of said feelers and means connecting said indicator for operation by the other of said feelers for indicating the relation of the points of said feelers to each other as compared with a known distance.

20. A cylinder gauge comprising, in combination, an elongated base presenting portions adapted to contact with the interior wall of a cylinder on two parallel lines, guide means secured to said base normal to a plane containing said parallel lines, a pair of relatively movable feelers supported by said base to reciprocate in a direction determined by said guide means and supported to contact with the cylinder at diametrically opposed points, indicating mechanism and means operatively connecting said indicating mechanism to said feelers.

21. A calipering instrument for internal cylindrical surfaces having, in combination, means forming a locating guide presenting portions for engaging internal cylindrical surfaces of different diameters at points along two parallel lines on said surfaces, means forming a contact feeler, means forming a second contact feeler, said feelers being independently movable relative to each other and to said means forming said locating guide on a line midway between said parallel lines and normal to a plane including said parallel lines, a casing containing indicating mechanism responsive to the degree of separation of said feeler members, one of the means forming said locating guide and feelers being fixed to said casing and the other two being movable relative to each other and to said casing.

22. A calipering instrument for internal cylindrical surfaces having, in combination, contact feeler locating means having portions for engaging internal cylindrical surfaces of different diameters at points along two parallel lines on said surfaces, a pair of contact feelers independently movable relative to each other and to said locating means on a line midway said parallel lines and normal to a plane including said lines, a casing carried by one of said feelers and movable therewith, the other of said feelers movable relative to said casing, and indicating mechanism in said casing responsive to the degree of separation of said feelers.

23. A calipering instrument for internal cylindrical surfaces having, in combination, contact feeler locating means having portions for engaging internal cylindrical surfaces of different diameters at points along two parallel lines on said surfaces, a pair of contact feelers independently movable relative to each other and to said locating means on a line midway said parallel lines and normal to a plane including said lines, a casing carried by one of said feelers and movable therewith, spring means urging the other of said feelers outwardly of said casing, and indicating mechanism in said casing actuated by movement of the last-named feeler relative to said casing.

24. A calipering instrument for internal cylindrical surfaces having, in combination, means forming a locating guide presenting portions for engaging internal cylindrical surfaces of different diameters at points along two parallel lines on said surfaces, means forming a contact feeler, means forming a second contact feeler, said feelers being independently movable relative to each other and to said means forming said locating guide on a line midway between said parallel lines and normal to a plane including said parallel lines, a casing containing indicating mechanism, one of said means forming said locating guide and feelers being fixed to said casing and the other two being movable relative to said casing, and spring means urging relative separation of said feelers for contacting them with the cylindrical surfaces and actuation of said indicating mechanism.

In testimony whereof I have hereunto set my hand.

WARREN AMES.